(12) United States Patent
Gupta

(10) Patent No.: US 10,965,628 B2
(45) Date of Patent: *Mar. 30, 2021

(54) DYNAMIC CUSTOMIZED ELECTRONIC MESSAGE CONTENT GENERATION

(71) Applicant: Groupon, Inc., Chicago, IL (US)

(72) Inventor: Mohit Gupta, Sunnyvale, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,289

(22) Filed: Jul. 3, 2018

(65) Prior Publication Data

US 2019/0020611 A1 Jan. 17, 2019

Related U.S. Application Data

(63) Continuation of application No. 13/908,802, filed on Jun. 3, 2013, now Pat. No. 10,044,650.

(51) Int. Cl.
*G06F 16/95* (2019.01)
*H04L 12/58* (2006.01)

(52) U.S. Cl.
CPC .................. *H04L 51/063* (2013.01)

(58) Field of Classification Search
CPC .................................... H04L 51/063
USPC ........................................... 709/206
See application file for complete search history.

(56) References Cited

U.S. PATENT DOCUMENTS

| | | | |
|---|---|---|---|
| 7,451,186 B2 | 11/2008 | Morinigo et al. | |
| 8,732,271 B1 | 5/2014 | Burns et al. | |
| 9,275,373 B2* | 3/2016 | Cianco-Bunch | G06Q 10/107 |
| 9,508,060 B2* | 11/2016 | Jamison | G06Q 10/107 |
| 2004/0215479 A1* | 10/2004 | Dorsey | G06Q 10/107 |
| | | | 709/206 |
| 2004/0249709 A1* | 12/2004 | Donovan | G06Q 30/02 |
| | | | 705/14.46 |
| 2008/0133345 A1 | 6/2008 | Cordery et al. | |
| 2012/0102008 A1 | 4/2012 | Kaeaeriaeinen et al. | |
| 2014/0244734 A1 | 8/2014 | Nutt et al. | |

(Continued)

OTHER PUBLICATIONS

U.S. Application filed Mar. 14, 2013, In re: Aggarwal et al. entitled "Promotion Offering System", U.S. Appl. No. 13/829,581.

*Primary Examiner* — Moustafa M Meky
*Assistant Examiner* — Sahera Halim
(74) *Attorney, Agent, or Firm* — Alston & Bird LLP

(57) ABSTRACT

Discussed herein are dynamically generated, customized electronic messages based on, for example, data representing attributes of an electronic message to be generated for an intended recipient; and, in response to receiving the data, sending custom content triggering data based on the attributes, where the custom content triggering data represent at least a dynamic portion of customized content to be added subsequently into the electronic message while the electronic message is rendered for display to the intended recipient; generating the electronic message content, which includes the custom content triggering data; and sending the electronic message to the intended recipient; and, in response to receiving the custom content triggering data, determining attributes of the electronic message based on the custom content triggering data; and generating the dynamic portion of customized content based on the electronic message attributes.

21 Claims, 8 Drawing Sheets

(56) References Cited

U.S. PATENT DOCUMENTS

2014/0344734 A1\* 11/2014 Xu ........................ G06F 3/0488
715/765

\* cited by examiner

DYNAMIC CUSTOMIZED ELECTRONIC MESSAGE CONTENT GENERATION

CROSS REFERNCE TO RELATED APPLICATION

This application is a continuation of U.S. application Ser. No. 13/908,802, titled "DYNAMICUSTOMIZED ELECTRONIC MESSAGE CONTENT GENERATION" filed Jun. 3, 2013, the content of which is incorporated herein by reference in its entirety.

FIELD

Embodiments of the invention relate, generally, to automated generation of electronic message content that is customized for the message recipient.

BACKGROUND

Current approaches for generating message content exhibit a plurality of problems that are insufficient, ineffective and/or the like. Through applied effort, ingenuity, and innovation, solutions to improve such known approaches have been realized and are described in connection with embodiments of the present invention.

SUMMARY

In general, embodiments of the present invention provide herein systems, methods and computer readable media for dynamically generating customized electronic message content by receiving data representing attributes of an electronic message to be generated for an intended recipient; and, in response to receiving the message attribute data, generating custom content triggering data based on the attributes, where the custom content triggering data represent at least a dynamic portion of customized content to be added subsequently into the electronic message while the electronic message is rendered for display to the intended recipient; generating the electronic message content, which includes the custom content triggering data; and sending the electronic message to the intended recipient; and, in response to receiving the custom content triggering data, determining attributes of the electronic message based on the custom content triggering data; and generating the dynamic portion of customized of content based on the electronic message attributes.

These and other embodiments can optionally include one or more of the following features. The custom content triggering data may include a message identifier. The attributes of the message may include attributes of the intended recipient and message history attributes that include, for example, a time that the electronic message was sent to the intended recipient and viewed status data representing whether the electronic message previously was viewed by the intended recipient. Generating the dynamic portion of customized content may include generating the dynamic portion of customized content using the attributes of the electronic message; personalizing the dynamic portion of customized content based on the attributes of the intended recipient; configuring the dynamic portion of customized content using at least one message template; and caching the dynamic portion of customized content. Personalizing the dynamic portion of customized content may include identifying, using at least one social network, at least one social connection of the intended recipient; and personalizing the dynamic portion of customized content based on attributes of the social connection. Generating the dynamic portion of customized content based on attributes of the electronic message may include determining whether the intended recipient previously has opened the electronic message; and, if the intended recipient previously has opened the electronic message, retrieving and returning the cached generated dynamic portion of customized content.

In general, embodiments of the present invention provide herein systems, methods and computer readable media for generating an electronic message that includes customized electronic message content by receiving data representing attributes of an electronic message to be generated for an intended recipient; and, in response to receiving the data, generating custom content triggering data based on the attributes of the electronic message; generating the electronic message content that includes the custom content triggering data; and sending the electronic message to the intended recipient. In embodiments, the custom content triggering data represent at least a dynamic portion of customized content to be added subsequently into the electronic message while the electronic message is rendered for display to the intended recipient.

These and other embodiments can optionally include one or more of the following features. Generating the electronic message content includes generating predetermined content. The electronic message comprises email or SMS text messages. The attributes of the electronic message include a message identifier and attributes of an intended recipient of the electronic message. The generated electronic message content is HTML and the custom content triggering data is included in an HTML image tag. The generated electronic message content includes an embedded API function call, and the custom content triggering data is included as an argument in the API function call.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
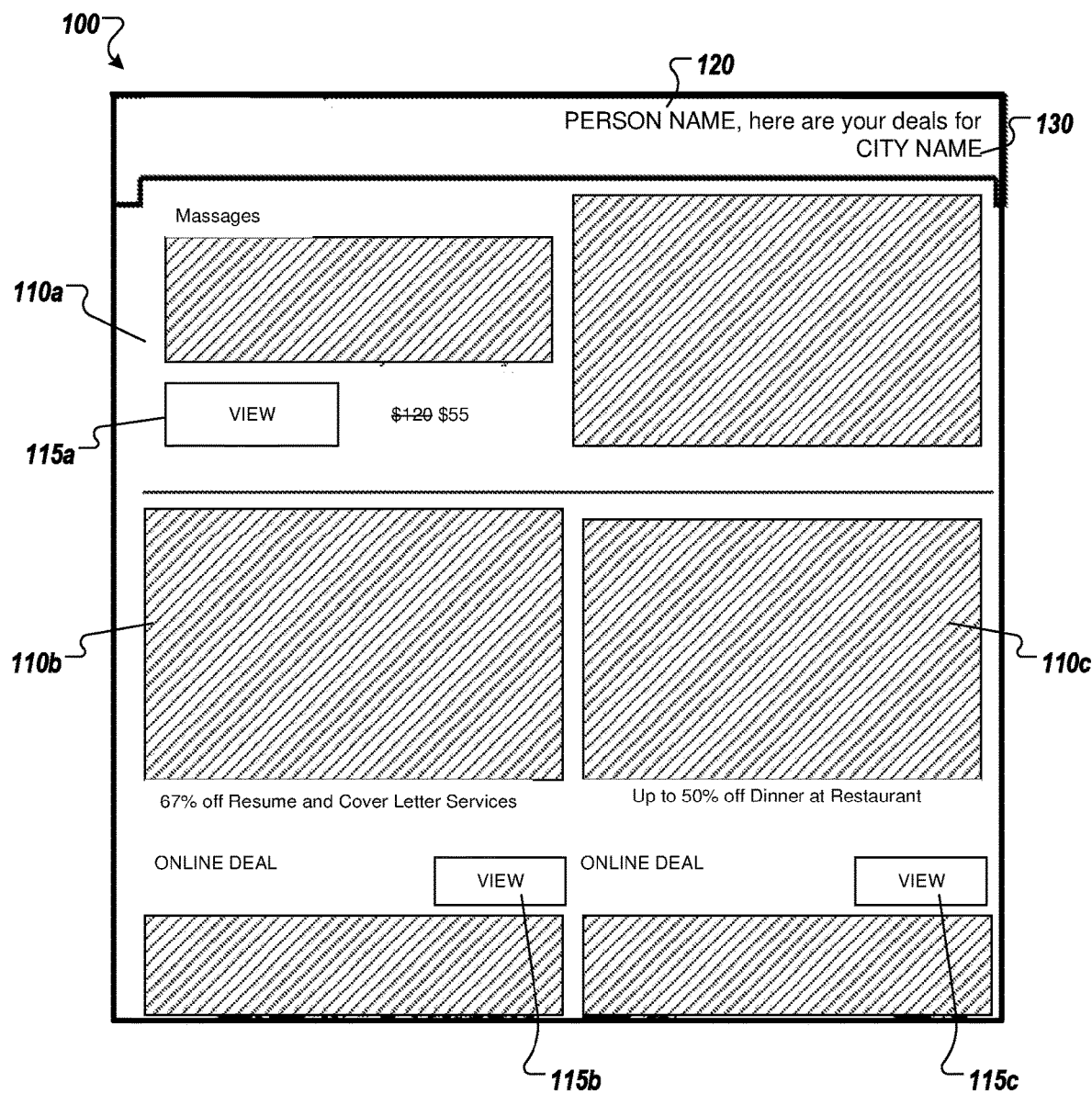
FIG. 1 illustrates a portion of an example email that includes content that has been dynamically generated in accordance with some embodiments discussed herein.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

A promotion provider is an example of a business that relies on electronic or other types of messages to communicate timely information to large numbers of consumers. It is important to ensure that each consumer receives a notification about promotions that the consumer is most likely to purchase based on the most up-to-date information about the available promotion(s) and/or user(s). The approaches discussed herein improve on systems that require content for promotional electronic and/or traditional messages to be determined weeks, days, or even hours in advance of the message being sent.

The example systems and methods described herein are configured to dynamically generate electronic message content that is customized for the recipient of the electronic message. In some embodiments, customized message content is generated in response to receiving custom content triggering data representing at least a dynamic portion of the content in an electronic message (e.g., an email) that is being rendered for viewing by a recipient. In some embodiments, the customized message content is generated after the electronic message is sent to the consumer, but before the message is rendered for viewing. The custom content can be delivered to the recipient's device separate from other content in the electronic message, such as when the electronic message is rendered by the recipient's device.

The custom content can include custom content triggering data representing, which can include a unique message identifier used by the system to determine attributes of the electronic message. Examples of electronic message attributes include attributes of the predetermined message content that has been sent to the recipient (e.g., message subject line), attributes of the recipient (e.g., recipient email address), and/or message history data (e.g., time that the message was sent, viewed status data representing whether the message previously has been viewed by the recipient). Customized message content that is personalized for the recipient is generated based on these attributes. In some embodiments, personalization of message content also can include attributes of the recipient's social connections and/or other data associated with the recipient.

FIG. 1 illustrates a portion of an example email 100 that includes customized content that has been dynamically generated. The example email 100 has been sent from a promotion provider to a particular recipient (Person Name 120 in this example), and the customized content that has been dynamically generated includes a set of graphics (110a, 110b, and 110c), each graphic respectively representing a promotion that is available for purchase, for free, and/or otherwise. The promotions represented by the graphics have been determined to be relevant to the particular recipient (Person Name 120) who is at or otherwise associated with a particular location (City Name 130 in this example). For example, the recipient may have travel plans or otherwise indicated a desire to see promotions associated with City Name 130. Each of the graphics can include images and other descriptive material about a promotion (a "deal offer," sometimes referred to as a "deal," for purchase in this example). Each graphic can also include at least one active link widget (115a, 115b, and 115c). In response to selection of an active link widget, the recipient can be directed (e.g., via a browser) to the promotion provider's website where the recipient's device can be used to present additional details about and finalize a purchase of the promotion associated with the widget.

Referring to the example email 100, the customized promotion content display layout (e.g., the organization of the set of promotion graphics) can have a custom configuration based on a ranking of the promotions identified as relevant to the recipient. For example, the graphic that is displayed at the very top of the layout can represent a featured deal 110a, which may be associated with the highest ranking for that particular recipient. In some embodiments, the featured deal 110a is the promotion that has been ranked as the promotion most likely to be of interest to the recipient, and its position in the layout of graphics is designed to emphasize this particular portion of the customized content to the recipient. In addition to being displayed alone at the top of the display (and thus most likely be the first thing to be read by the recipient), the featured deal 110a graphic can be larger than the other graphics included in email 100 and the active link widget 115a of featured deal 110a is more prominent. In the example email 100, the massage promotion is the featured deal 110a.

Figure 2:
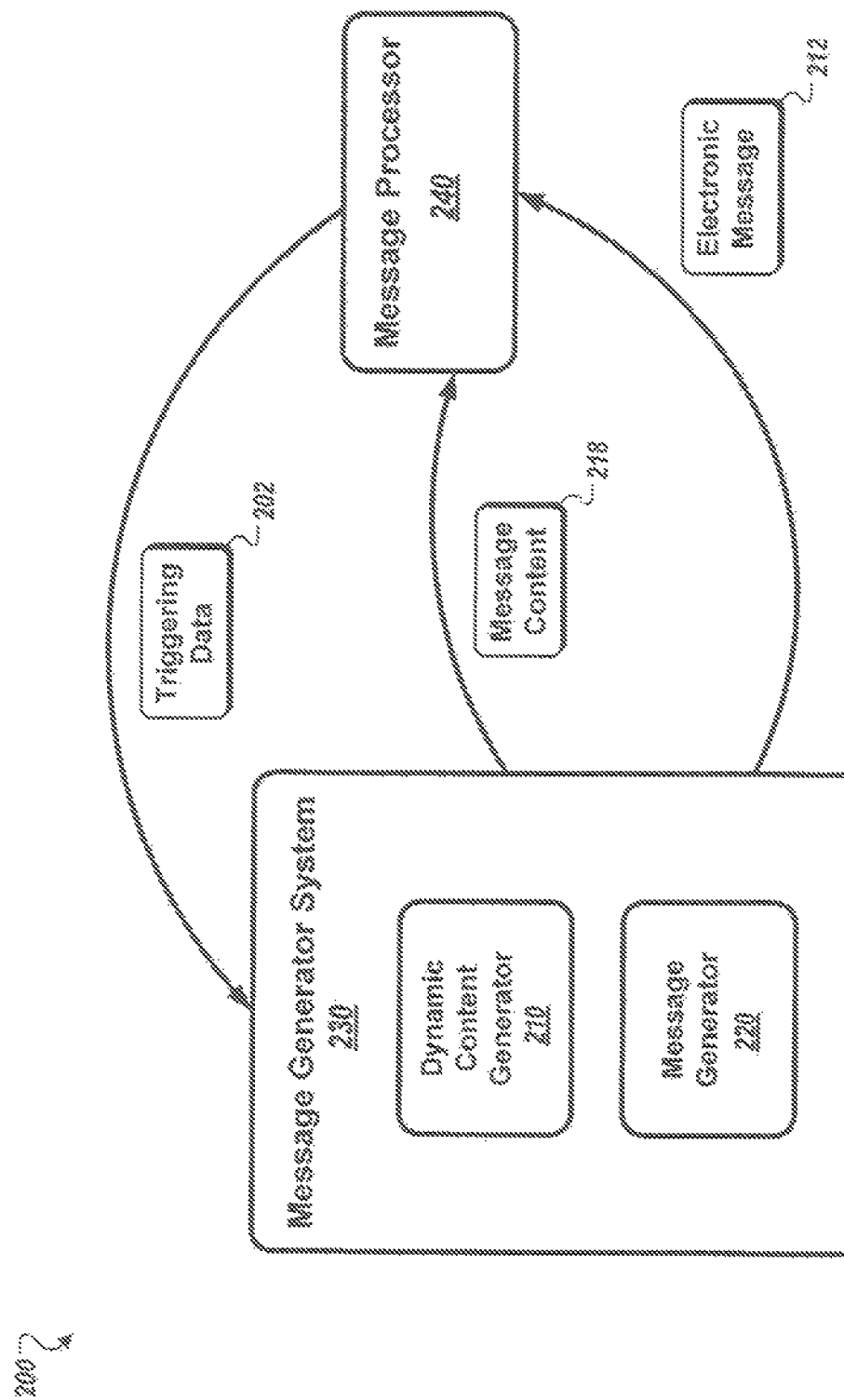
FIG. 2 illustrates an example system that can be configured to implement a sequence of events that facilitate the generation of an electronic message that includes customized content to be added subsequently while the electronic message content is rendered for display to an intended recipient in accordance with some embodiments discussed herein.

FIG. 2 illustrates an example system 200 that can be configured to perform a machine-implemented method including a sequence of events that facilitate the generation of an electronic message 212 that includes customized content 218 to be added subsequently while the electronic message content is rendered for display by an intended recipient's device. System 200 comprises a message generator system 230 that can be configured to generate the electronic message content for an intended message recipient. System 200 can also comprise a message processor 240 that can be configured to render the electronic message content for display to the message recipient. Message generator system 230 can include a message generator 220 that can be configured to generate an electronic message 212 for an intended recipient; and a dynamic content generator 210 that can be configured to generate the customized message content 218 in response to receiving triggering data 202 from the message processor 240.

In some embodiments, the content of the electronic message 212 can include predetermined content that is static in that it does not change from the time that the message is initially sent at 240 and after the entire message is rendered. For example, the content of an email's a subject line may be predetermined content that is generated when the email is sent and does not change during the rendering process discussed below.

Dynamic content generator 210 may generate the message, or at least the dynamic content portion(s) of the message. In some embodiments, dynamic content generator 210 can be configured to update the dynamic content portion (s) of message 212 independent from the generation and/or the transmission of the static content portion(s) of the message 212. For example, the dynamic content generator may generate a first set of dynamic content in the morning (e.g., to include lunch deal offers), update the dynamic content in the afternoon (e.g., to replace the lunch deal offers with dinner deal offers), and again update the dynamic content in the evening (e.g., with breakfast deal offers and/or late night entertainment deal offers). In addition to or instead of time of day, any other relevant factors can be used to generate and/or update dynamic content, some examples of which are discussed herein.

The generated dynamic content can be stored in non-transitory computer readable media until dynamic content generator 210 receives custom content triggering data 202 representing an electronic message (e.g., an email message) that is being rendered by a message processor 240 (e.g., an email client) in response to the message being opened by a recipient. In response to receiving custom content triggering data 202, the dynamically generated customized message content 218 can be sent to the message processor 240 (e.g., email client) that is rendering the message content. The message processor 240 can be the same device that transmitted the custom content triggering data 202 to the system 230 as shown in FIG. 2, or could be a different device (such as when the recipient opens the email on a second device after opening the email previously on a first device). For example, the customized content may be returned to a message processor in response to receiving an API function invocation. In another example, the customized content may be returned as an image in response to receiving a request from a message processor to resolve an embedded HTML image tag. In some embodiments, the generated customized message content 218 is cached and, in some embodiments, is associated with the message identifier and stored in the message repository (discussed below).

In some embodiments, the dynamic generation of customized message content can be triggered when dynamic content generator 210 receives custom content triggering data 202 representing an electronic message (e.g., an email message) that is being rendered by a message processor 240 (e.g., an email client) in response to the message being opened by a recipient. In some embodiments, the received custom content triggering data 202 can include a unique message identifier that message generator system 230 assigns to the electronic message before the message was sent to the recipient.

The content of the electronic message can also include custom content triggering data 202 that represents at least a portion of the message content to be added subsequently into the electronic message at a time subsequent to the message being generated by message generator system 220. Turning to example email 100, custom content trigger data 202 can represent a set of promotions that are currently available and most relevant to the recipient when the message content is being rendered for viewing by the recipient. In various embodiments, the custom content triggering data 202 is embedded in the predetermined message content that is being generated by message generator 220. When the predetermined message content is being rendered by message processor 240, the embedded custom content triggering data is extracted and transmitted to the message generator system 230.

There are a variety of possible implementations for a message processor 240 to detect, extract, and transmit embedded custom content triggering data during rendering of message content. For example, in some embodiments, the message generator system 230 publishes an external Application Programming Interface (API), and the predetermined message content includes an embedded system 230 API function call that includes the custom content triggering data 202 as an argument. This API function call can be detected and invoked by a message processor 240 when the message content is being rendered for viewing, resulting in the passing of the custom content triggering data to the message generator system 230 when the function is invoked. In some embodiments, an email client message processor 240 can be configured to detect and invoke the system 230 API function during the rendering of email content received from a particular sender associated with the system 230. In some other embodiments, a browser message processor 240 may be configured to include a browser plugin that is configured to recognize and invoke the system 230 API calls during the rendering of email content received from a particular sender associated with the system 230.

Alternatively or additionally, in some embodiments, the predetermined message content 212 can be formatted as Hypertext Markup Language (HTML) that includes at least one HTML image tag that references a Uniform Resource Identifier representing the system 230 as the image source and includes the custom content triggering data, as, for example:

<img src="http://www.domain.com/xxxyyyzzz"> where http://www.domain.com is the location of the image source and xxxyyyzzz is the custom content triggering data. The custom content triggering data 202 is transmitted to the system 230 at the time that the HTML message content is rendered by the message processor 240 and the image tag is being resolved.

If the customized content cannot be generated (e.g., because there is no network connection available for the callback to proceed), default content, such as images, can be presented. The default content can be embedded in the electronic message 212. For example, the default content may be provided by the message processor 240 when the message processor 240 receives no response to triggering data 202 within a predetermined period of time and/or in response to determining that the recipient device does not have internet access at time of rendering. The default content may include promotional information that may be generic to all users (e.g., a deal offer for goods that can be ordered from anywhere in the United States) and/or an error message (such as an "x") in the place of the dynamic content that cannot be retrieved.

Figure 3:
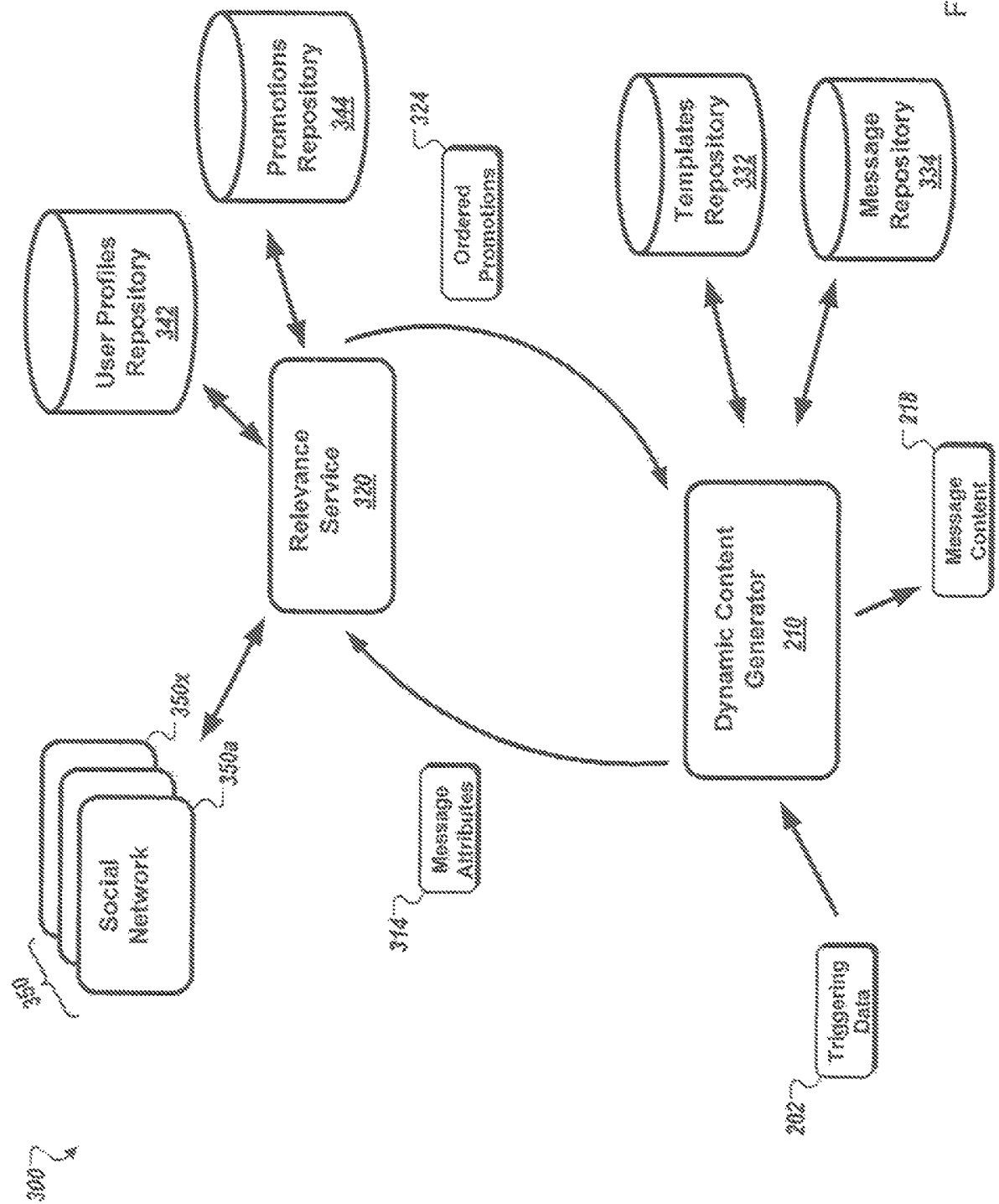
FIG. 3 illustrates an example system that can be configured to implement a sequence of events that facilitate the dynamic generation of customized message content representing promotions in accordance with some embodiments discussed herein.

FIG. 3 illustrates an example system 300 that can be configured to implement a sequence of events that facilitate the dynamic generation of customized electronic message content representing promotions. System 300 includes the dynamic content generator 210, a relevance service 320, a templates repository 332, a message repository 334, a user profiles repository 342, and a promotions repository 344. These components can be communicatively coupled to one or more of each other. Though the components identified above are described as being separate or distinct, two or more of the components may be combined into a single component and/or be configured to execute a single process. The functional description provided herein, including separation of responsibility for distinct functions, is by way of example. Other groupings or other divisions of functional responsibilities can be made as necessary or in accordance with design preferences. System 300 further includes communicative coupling of one or more system components to at least one social network 350.

In some embodiments, dynamic content generator 210 uses the received custom content triggering data 202 to retrieve stored data representing attributes 314 of a message that currently is being rendered for viewing. In some embodiments, data representing attributes of each message that is sent by the system 300 can be stored in a message repository 334.

In some embodiments, stored message attributes may include attributes of the predetermined message content (e.g., message subject line), attributes of the recipient (e.g., recipient email address), and/or message history data (e.g., time that the message was sent, whether the message previously has been opened by the recipient). In some embodiments, stored attributes may further include cached customized message content that was generated dynamically by the system 300 when the message previously was opened by the recipient. Thus, the system 300 can be configured to generate/transmit new customized message content only in response to determining that this is the first time a message is opened by a recipient, and will return cached previously generated customized content in response to identifying subsequent openings of the message by the recipient.

When message content 218, including the dynamic content, is not received in response to triggering data 202 being sent, message processor 240 can be configured to send a default displayed message that indicates the default content was presented to the recipient instead of the dynamic content. In some embodiments, the dynamic content stored in a message repository 334 can then be replaced with the default content actually rendered for display in response to dynamic content generator 210 receiving the default displayed message from the recipient's device. As such, should the recipient attempt to view the electronic message with a second device, the recipient will see the same default content instead of the dynamic content generated by the dynamic content generator 210.

In some embodiments, message content that is most relevant to a recipient is determined based on attributes 314 of the message. In some embodiments in which the customized message content describes a group of available promotions, as described with respect to the example email message 100, the ranked group of promotions most relevant to the message recipient is determined by a relevance service 320. For example, determination of a ranked group of promotions most relevant to a message recipient may be implemented by a relevance service 320 as described in U.S. patent application Ser. No. 13/829,581 entitled "Promotion Offering System" and filed on Mar. 14, 2013, which is incorporated herein in its entirety.

In some embodiments, data representing attributes of promotions are stored in a promotions repository 344. Stored attributes associated with a promotion may include a promotion location, promotion amount or price range, promotion category, promotion discount, promotion discount price range, likely promotion purchase time, redemption time, and promotion offering time period. In some embodiments, stored promotion attributes may further include aggregated data that include promotion performance metrics representing consumer behavior in redeeming vouchers ("instruments," as referred to hereinafter) offered during the promotion.

In some embodiments, user profile data representing attributes of message recipients are stored in a user profiles repository 342. Stored user profile data associated with a message recipient may include name, age, location gender, email domain, IP address, occupation, educational background, past consumer behavior, and/or any other type of data that includes previously accepted and rejected promotion program offerings.

In some embodiments, the message attributes 314 provide initial promotion attribute search criteria, and the system selects a set of promotions that match those criteria from the promotions repository 344. For example, initial promotion attribute search criteria may include a "food and drink" promotions category and a particular "City, State" location.

In some embodiments, the message attributes 314 further include a message recipient identifier. The message recipient identifier can be used to retrieve stored user profile data representing the message recipient, and the initial search criteria can be personalized to the message recipient by further including the recipient's associated user profile data. For example, a set of selected food and drink promotions in a particular geographic location, such as a city, may be modified to include only promotions not yet viewed and/or not yet purchased by the message recipient and/or those related to those already purchased by the message recipient, among other things.

In some embodiments, a selected set of promotions is ranked based on the attributes respectively associated with the promotions and/or the user profile data representing the message recipient. For example, a set of promotions may be ranked according to performance metrics associated with each promotion, resulting in the best performing promotions being assigned the highest rank. In some embodiments, as described in U.S. patent application Ser. No. 13/829,581, which has been incorporated by reference in its entirety, each promotion is assigned a score based on its respective associated attributes, and a set of promotions may be ranked based on the score respectively associated with each of the promotions.

In some embodiments, the ranking of the selected set of promotions may be modified based on one or more attributes from the message recipient's user profile data, thus personalizing the ranking to the message recipient. For example, the recipient's user profile data may include a preference for family-friendly restaurants, and the relative ranking of each promotion for a family-friendly restaurant will be increased. In another example, the recipient's user profile data may include a particular location, resulting in an increase of the relative rankings of the promotions having a location nearest to and/or remote from (such as for travel promotions) the recipient's particular location.

Additionally or alternatively, the ranking of the selected set of promotions may be personalized to the message recipient based on recipient-specific and profile-independent (RSPI) weighting data, such as consumer behavior data of the recipient's social connections. In some embodiments, a set of the recipient's social connections is determined by accessing at least one social network (350a . . . 350x). If, based on user profile data representing a social connection, it is determined that the social connection has purchased a selected promotion, the ranking of that promotion is maximized. Thus, selected promotions that also have been preferred by the recipient's social connections are given the highest ranking.

In some embodiments, dynamic content generator 210 generates the customized message content based on ranked set of promotions received from relevance service 320. In some embodiments, generating the customized message content is based on at least one message template stored in a templates repository 332. Turning to the example email 100, the promotion graphics layout may be described by a message template, and the positioning of the graphics within the layout is based on the rankings of the set of promotions. The graphic representing the highest-ranked promotion is assigned to the "featured deal" position (e.g., 110a in example email 100), and graphics representing higher ranked promotions are assigned positions closer to the "featured deal" position.

In some embodiments, the dynamically generated customized message content 218 is returned to the message processor (e.g., email client) that is rendering the message content and that transmitted the custom content triggering data 202 to the system 300. For example, the customized content may be returned to a message processor in response to receiving an API function invocation. In another example, the customized content may be returned as an image in response to receiving a request from a message processor to resolve an embedded HTML image tag. In some embodiments, the generated customized message content 218 is cached and, in some embodiments, is associated with the message identifier and stored in the message repository 332.

Figure 4:
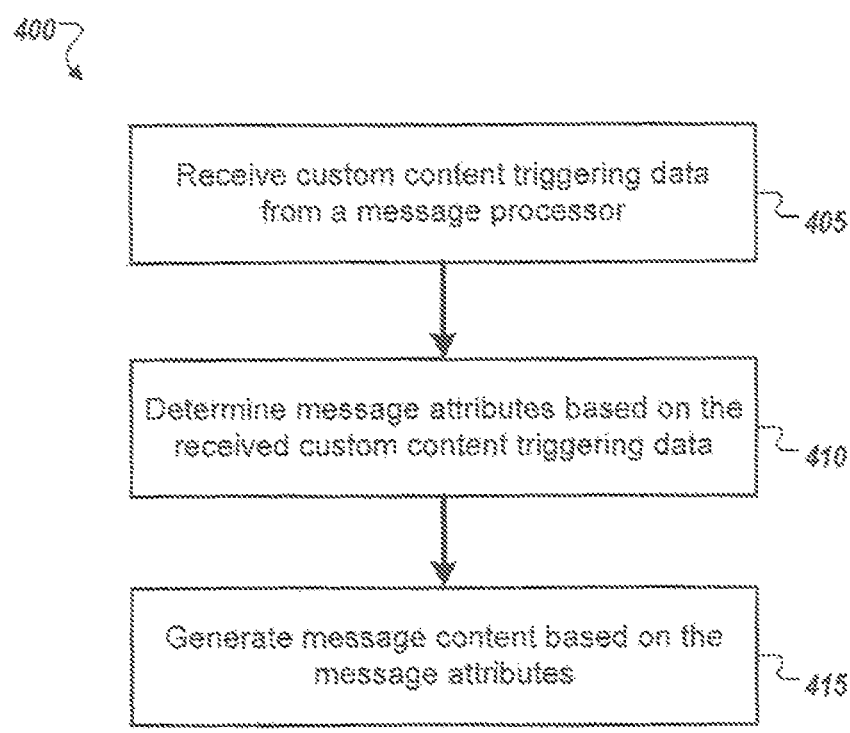
FIG. 4 is a flow diagram of an example method for dynamically generating customized message content in response to receiving custom content triggering data in accordance with some embodiments discussed herein.

FIG. 4 is a flow diagram of an example method 400 for dynamically generating customized message content in response to receiving custom content triggering data. For convenience, the method 400 will be described with respect to a system that includes one or more computing devices and performs the method 400. Specifically, the method 400 will be described with respect to its implementation by system 300.

In some embodiments, at 405 the system receives custom content triggering data from a message processor that is rendering an electronic message. As described previously with respect to FIG. 3, custom content triggering data may be embedded into the predetermined content of a message that is being rendered by a message processor, and that data has been transmitted to the system by the message processor.

In some embodiments, the system determines at 410 attributes of the message based on the received custom content triggering data. In some embodiments, the custom content triggering data includes a unique message identifier that was assigned to the message before the message was sent, and the system uses the unique message identifier to retrieve attributes of the message that are stored in a message repository 334.

In some embodiments, the system dynamically generates, at 415, message content based on the message attributes. In some embodiments, the message attributes may include attributes of the predetermined message content (e.g., message subject line), attributes of the recipient (e.g., recipient email address), and/or message history data (e.g., time that the message was sent, whether the message previously has been viewed by the recipient). Message content generation is discussed in more detail below with respect to FIG. 5.

Figure 5:
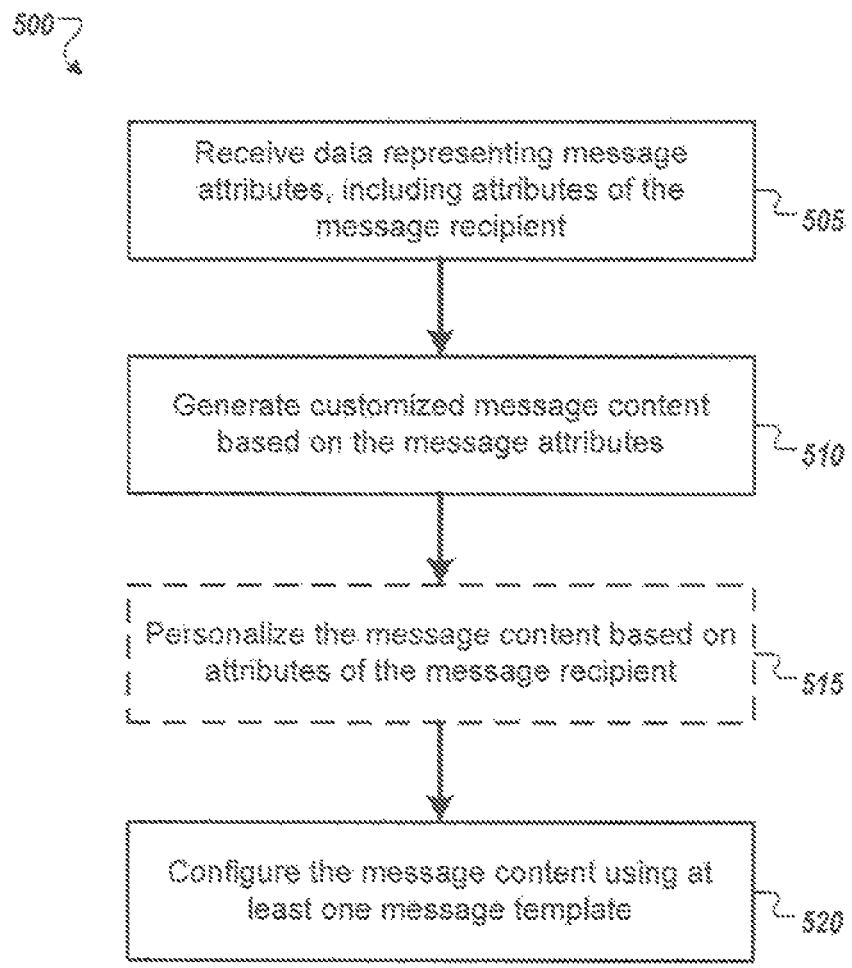
FIG. 5 is a flow diagram of an example method for dynamically generating customized message content in accordance with some embodiments discussed herein.

FIG. 5 is a flow diagram of an example method 500 for dynamically generating customized message content. For convenience, the method 500 is described with respect to a system that includes one or more computing devices configured to perform the method 500. Specifically, the method 500 is described with respect to its implementation by dynamic content generator 210 and relevance system 320 in system 300.

In some embodiments, at 505, the system is configured to receive attributes of a message. As previously described in connection with FIG. 3, attributes of a message may include attributes of the recipient.

In some embodiments, at 510, the system is configured to generate customized message content based on the message attributes. In some embodiments, the system determines relevant message content based in part on stored data representing attributes of the message content. For example, as previously described with respect to system 300 in which the message content describes promotions to be offered to the message recipient, a relevance service 320 generates a ranked set of promotions that are ranked according to relevance, based on promotion attributes respectively representing each of the promotions. Optionally, in some embodiments, the generated message content may be personalized at 515 based on attributes of the message recipient.

In some embodiments, the system uses the message attributes to retrieve at least one stored message template with which to configure, at 520, the customized message content. For example, as previously described with respect to the generation of the content of email 100 by system 300, the system retrieves one or more templates representing the layout of graphics representing a set of promotions, generates each of the promotion graphics based on attributes respectively associated with each promotion, and determines the positioning of the graphics in the layout based on the relevance ranking of the promotions.

Figure 6:
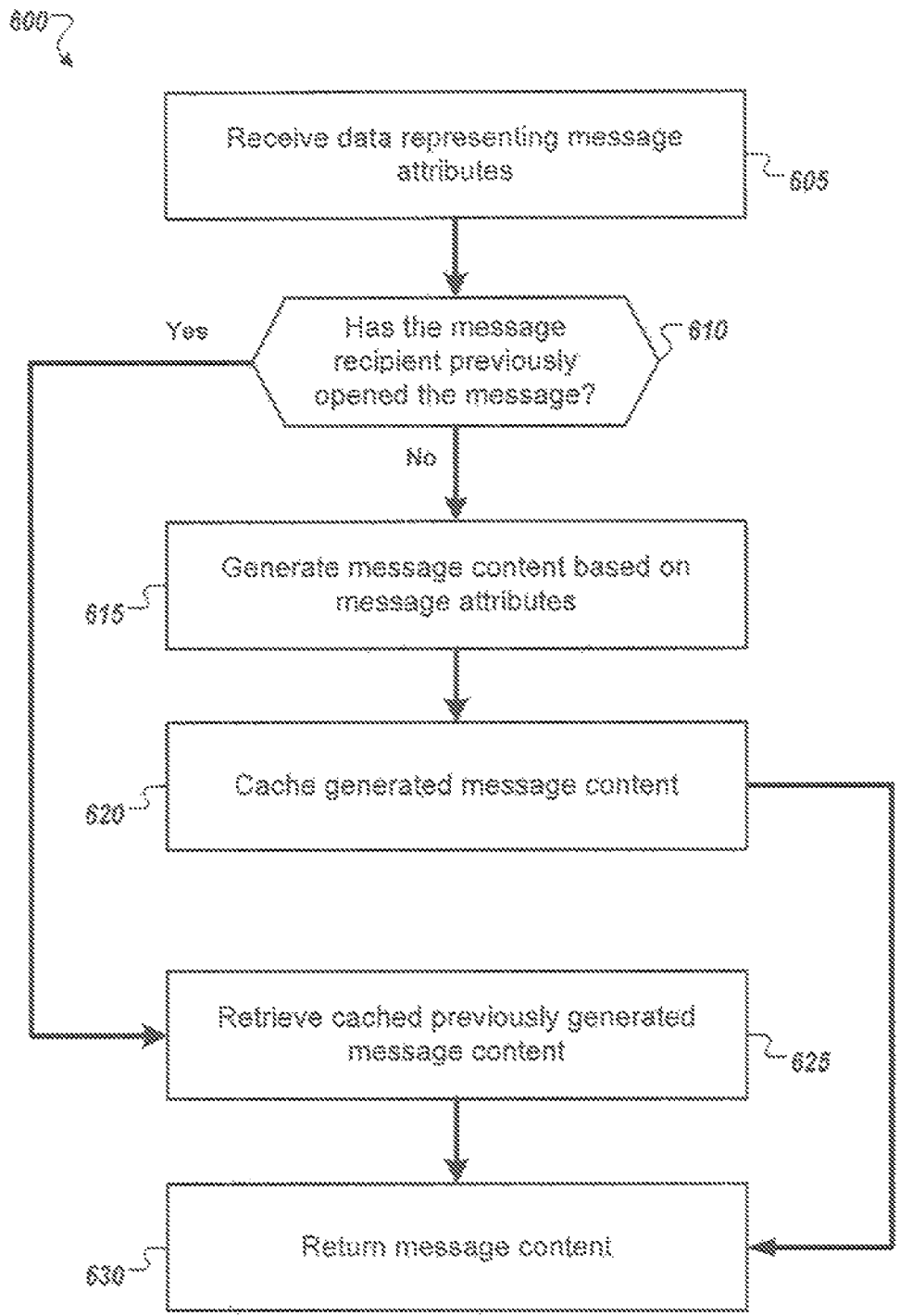
FIG. 6 is a flow diagram of an example method for only dynamically generating message content the first time that a message is opened by a recipient in accordance with some embodiments discussed herein.

FIG. 6 is a flow diagram of an example method 600 for dynamically generating customized message content only the first time that a message is opened by a recipient. For convenience, the method 600 will be described with respect to a system that includes one or more computing devices and performs the method 600. Specifically, the method 600 will be described with respect to its implementation by dynamic content generator 210 of system 300.

The system receives, at 605, data representing message attributes. As previously described with respect to method 300, the received data may include attributes of the predetermined message content, attributes of the recipient, and/or message history data.

In embodiments, the system uses the received message attribute data to determine, at 610, whether the message recipient previously has opened the message. In response to the system determining that the recipient has yet to open the message, the system proceeds to generate, at 615, customized message content based on the message attributes, caches, at 620, the newly generated customized message content, and returns, at 630, the newly generated content. In some embodiments, the system stores the cached generated message content in a message repository 334 as a message attribute.

In response to the system determining that the recipient previously has opened the message, the system retrieves, at 625, cached previously generated customized message content and returns, at 630, the cached customized message content to the message processor.

Figure 7:
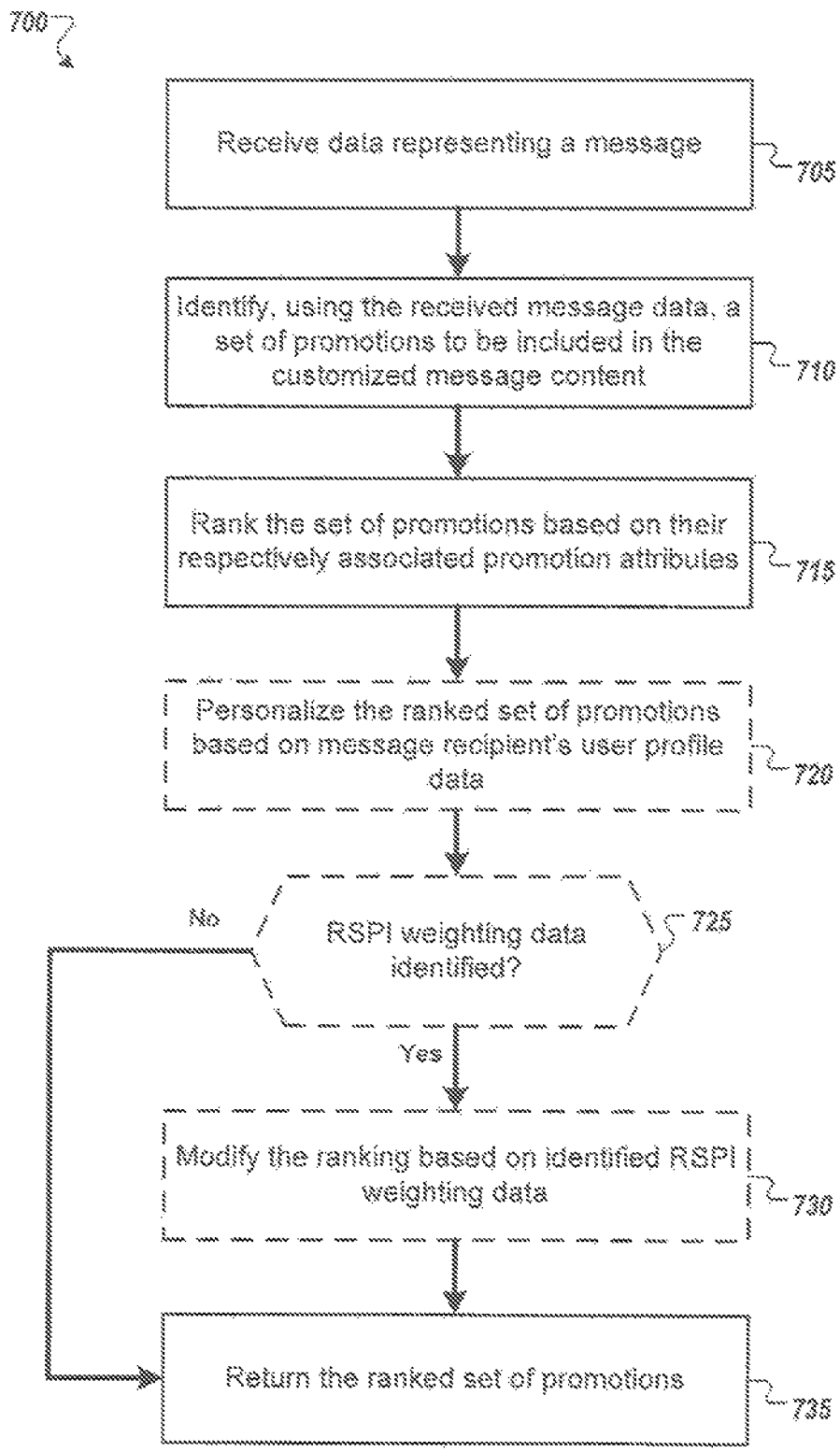
FIG. 7 is a flow diagram of an example method generating a ranked set of relevant promotions to include in customized message content in accordance with some embodiments discussed herein.

FIG. 7 is a flow diagram of an example method 700 for generating a ranked set of relevant promotions to include in customized message content. For convenience, the method 700 will be described with respect to a system that includes one or more computing devices and performs the method 700. Specifically, the method 700 will be described with respect to its implementation by relevance service 320 in system 300.

In embodiments, the system receives, at 705, data representing attributes of a message. As previously described, the data may include attributes of the predetermined message content (e.g., message subject line) and attributes of the recipient (e.g., recipient email address).

In embodiments, the system uses the received message attribute data to identify, at 710, a set of promotions to be included in the customized message content. For example, the received message attribute data can provide initial search criteria, and a set of promotions associated with attributes that match those criteria is selected from the promotions repository 344.

In embodiments, the system ranks, at 715, the selected set of promotions based in part on the attributes respectively associated with each of the promotions. For example, stored attributes of a promotion may include aggregated data representing performance metrics, and the better-performing promotions are ranked higher.

In some embodiments, the system optionally personalizes, at 720, the ranked set of promotions based in part on the message recipient's user profile data. The system may use the user profile data either alone or in combination with promotion attributes to modify the rankings of the promotions and/or prune the ranked set of promotions. For example, the system may increase the ranking of any promotion that is associated with an attribute that matches a preference of the recipient (e.g., a family-friendly restaurant). In another example, the recipient's user profile may contain history data representing the recipient's previous consumer behavior regarding promotions, and/or the system may remove from the selected set any promotion that the recipient has purchased previously.

In some embodiments, the system can be configured to optionally identify recipient-specific and profile-independent (RSPI) weighting data. For example, RSPI weighting data may include the time of day that the message is being opened. The time of day data can be used to prioritize one or more promotions that are more relevant to the current time of day when the message is opened. For example, when the message is opened between the hours of 10:00 am and noon, food service promotions for lunch can be prioritized over those for breakfast.

As another example, RSPI weighting data may include a recipient's social connections by accessing at least one social network. If any of the recipient's social connections also are represented by user profile data accessible to the system, the system uses that user profile data to determine, at 725, whether any of those social connections have responded to any of the selected set of promotions. The system modifies, at 730, the ranking of the identified set of promotions based on the behavior of the social connections by maximizing the rank of any promotion to which a social connection also has responded.

In some embodiments, processing completes when the system returns, at 735, a ranked set of promotions as illustrated in FIG. 1.

Figure 8:
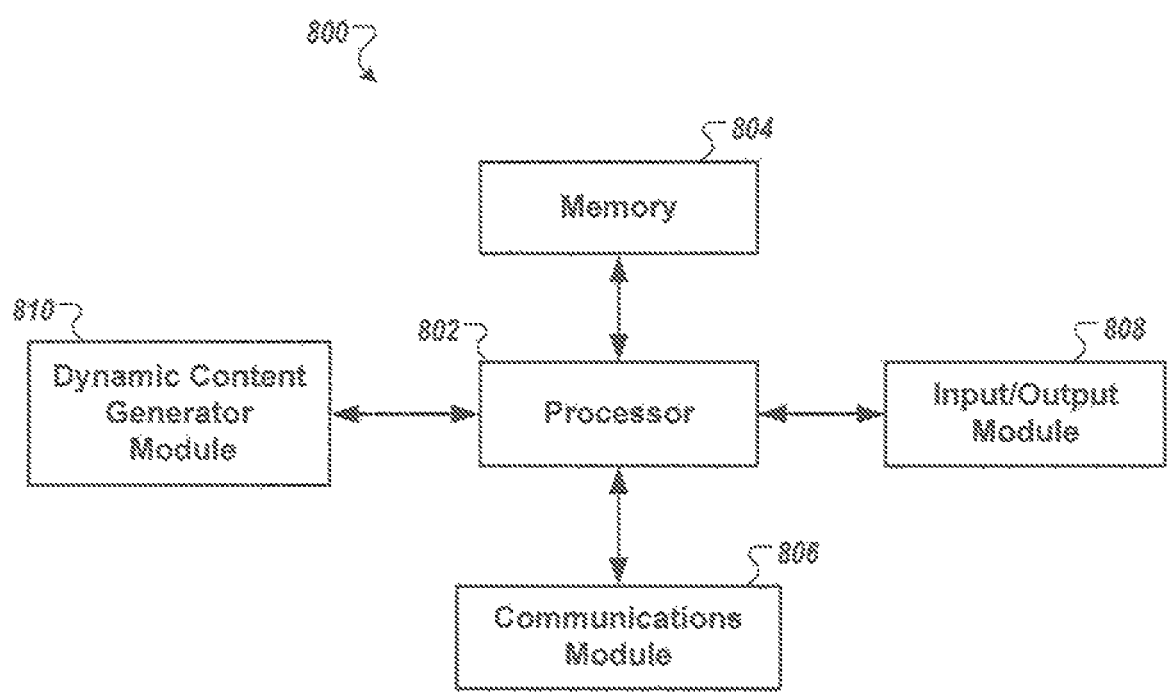
FIG. 8 illustrates a schematic block diagram of circuitry that can be included in a computing device, such as a dynamic message content generator, in accordance with some embodiments discussed herein.

FIG. 8 shows a schematic block diagram of circuitry 800, some or all of which may be included in, for example, dynamic message content generation system 300. As illustrated in FIG. 8 and in accordance with some example embodiments, circuitry 800 can include various means, such as processor 802, memory 804, communications module 806, and/or input/output module 808. As referred to herein, "module" includes hardware, software and/or firmware configured to perform one or more particular functions. In this regard, the means of circuitry 800 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 804) that is executable by a suitably configured processing device (e.g., processor 802), or some combination thereof.

Processor 802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 8 as a single processor, in some embodiments processor 802 comprises a plurality of processors. The plurality of processors may be embodied on a single computing device or may be distributed across a plurality of computing devices collectively configured to function as circuitry 800. The plurality of processors may be in operative communication with each other and may be collectively configured to perform one or more functionalities of circuitry 800 as described herein. In an example embodiment, processor 802 is configured to execute instructions stored in memory 804 or otherwise accessible to processor 802. These instructions, when executed by processor 802, may cause circuitry 800 to perform one or more of the functionalities of circuitry 800 as described herein.

Whether configured by hardware, firmware/software methods, or by a combination thereof, processor 802 may comprise an entity capable of performing operations according to embodiments of the present invention while configured accordingly. Thus, for example, when processor 802 is embodied as an ASIC, FPGA or the like, processor 802 may comprise specifically configured hardware for conducting one or more operations described herein. Alternatively, as another example, when processor 802 is embodied as an executor of instructions, such as may be stored in memory 804, the instructions may specifically configure processor 802 to perform one or more algorithms and operations described herein, such as those discussed in connection with FIG. 3.

Memory 804 may comprise, for example, volatile memory, non-volatile memory, or some combination thereof. Although illustrated in FIG. 8 as a single memory, memory 804 may comprise a plurality of memory components. The plurality of memory components may be embodied on a single computing device or distributed across a plurality of computing devices. In various embodiments, memory 804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 804 may be configured to store information, data (including analytics data), applications, instructions, or the like for enabling circuitry 800 to carry out various functions in accordance with example embodiments of the present invention. For example, in at least some embodiments, memory 804 is configured to buffer input data for processing by processor 802. Additionally or alternatively, in at least some embodiments, memory 804 is configured to store program instructions for execution by processor 802. Memory 804 may store information in the form of static and/or dynamic information. This stored information may be stored and/or used by circuitry 800 during the course of performing its functionalities.

Communications module 806 may be embodied as any device or means embodied in circuitry, hardware, a computer program product comprising computer readable program instructions stored on a computer readable medium (e.g., memory 804) and executed by a processing device (e.g., processor 802), or a combination thereof that is configured to receive and/or transmit data from/to another device, such as, for example, a second circuitry 800 and/or the like. In some embodiments, communications module 806 (like other components discussed herein) can be at least partially embodied as or otherwise controlled by processor 802. In this regard, communications module 806 may be in communication with processor 802, such as via a bus. Communications module 806 may include, for example, an antenna, a transmitter, a receiver, a transceiver, network interface card and/or supporting hardware and/or firmware/software for enabling communications with another computing device. Communications module 806 may be configured to receive and/or transmit any data that may be stored by memory 804 using any protocol that may be used for communications between computing devices. Communications module 806 may additionally or alternatively be in communication with the memory 804, input/output module 808 and/or any other component of circuitry 800, such as via a bus.

Input/output module 808 may be in communication with processor 802 to receive an indication of a user input and/or to provide an audible, visual, mechanical, or other output to a user. Some example visual outputs that may be provided to a user by circuitry 800 are discussed in connection with FIG. 2. As such, input/output module 808 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 800 is embodied as a server or database, aspects of input/output module 808 may be reduced as compared to embodiments where circuitry 800 is implemented as an end-user machine or other type of device designed for complex user interactions. In some embodiments (like other components discussed herein), input/output module 808 may even be eliminated from circuitry 800. Alternatively, such as in embodiments wherein circuitry 800 is embodied as a server or database, at least some aspects of input/output module 808 may be embodied on an apparatus used by a user that is in communication with circuitry 800, such as for example, pharmacy terminal 108. Input/output module 808 may be in communication with the memory 804, communications module 806, and/or any other component(s), such as via a bus. Although more than one input/output module and/or other component can be included in circuitry 800, only one is shown in FIG. 8 to avoid overcomplicating the drawing (like the other components discussed herein).

Dynamic content generator module 810 may also or instead be included and configured to perform the functionality discussed herein related to the dynamic generation of customized message content discussed above. In some embodiments, some or all of the functionality of dynamic content generation may be performed by processor 802. In this regard, the example processes and algorithms discussed herein can be performed by at least one processor 802 and/or dynamic content generator module 810. For example, non-transitory computer readable media can be configured to store firmware, one or more application programs, and/or other software, which include instructions and other computer-readable program code portions that can be executed to control each processor (e.g., processor 802 and/or dynamic content generator module 810) of the components of system 300 to implement various operations, including the examples shown above. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 300. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 802 and/or dynamic content generator module 810 discussed above with reference to FIG. 8, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 804) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for automated dynamic generation of customized electronic message content, the computer-implemented method comprising:
   receiving, from a client device, at a message processor, custom content triggering data that has been extracted and transmitted from an electronic message in response to an opening of the electronic message at the client device, after the opening of the electronic message and while the electronic message is being rendered for viewing, wherein the custom content triggering data comprises at least an identifier of the electronic message and a message recipient identifier,
   wherein the custom content triggering data is indicative of at least a dynamic portion of the customized electronic message content to be inserted into the electronic message during a rendering of the electronic message on the client device; and
   in response to receiving the custom content triggering data:
      determining, by the message processor, attributes of the electronic message being rendered based on the custom content triggering data; and
      generating the dynamic portion of the customized electronic message content to be inserted into the electronic message based on the attributes of the electronic message, comprising:
         retrieving, based on the message recipient identifier, user profile data associated with a recipient of the electronic message, wherein the user profile data comprises at least a user preference attribute.

2. The computer-implemented method of claim 1, wherein the custom content triggering data is embedded in at least one of an API function call and an HTML image tag within the electronic message being rendered, wherein in an instance in which the custom content triggering data is embedded in the API function call, receiving the API function call in response to the opening of the electronic message at the client device, the API function call invoked by the electronic message after the opening of the electronic message while the electronic message is being rendered for viewing, wherein the API function invocation comprises the custom content triggering data as an argument.

3. The computer-implemented method of claim 2, wherein the determined attributes of the electronic message comprise attributes of the recipient and message history attributes that include a time that the electronic message was sent to the recipient and viewed status data representing whether the electronic message previously was viewed by the recipient.

4. The computer-implemented method of claim 3, wherein the generating of the dynamic portion of the customized electronic message content comprises:
   receiving attributes data representing the determined attributes of the electronic message;
   generating the dynamic portion of the customized electronic message content using the attributes data;
   personalizing the dynamic portion of the customized electronic message content only for the particular intended recipient based on the user preference attribute, wherein the dynamic portion of the customized electronic message content includes at least one of promotions not yet viewed and/or not yet purchased by the particular intended recipient and promotions related to promotions already purchased by the particular intended recipient; and
   configuring the dynamic portion of the customized electronic message content using at least one message template.

5. The computer-implemented method of claim 4, wherein personalizing the dynamic portion of the customized electronic message content for the particular intended recipient comprises:
   identifying, using at least one social network, at least one social connection of the particular intended recipient; and
   personalizing the dynamic portion of the customized electronic message content based on attributes of the at least one social connection.

6. The computer-implemented method of claim 3, further comprising caching the generated dynamic portion of the customized electronic message content.

7. The computer-implemented method of claim 6, wherein the generating of the dynamic portion further comprises:
   determining, based on the viewed status data, whether the particular intended recipient previously has opened the electronic message; and
   in response to determining that the recipient previously has opened the electronic message,
      retrieving the cached dynamic portion of customized electronic message content; and
      including the cached dynamic portion of customized electronic message content in the generated dynamic portion.

8. An apparatus configured for automated dynamic generation of customized electronic message content, the apparatus comprising at least one processor and at least one memory including computer program code, the at least one memory and the computer program code configured to, with the at least one processor, cause the apparatus to at least:

receive, from a client device, at a message processor, custom content triggering data that has been extracted and transmitted from an electronic message in response to an opening of the electronic message at the client device, after the opening of the electronic message and while the electronic message is being rendered for viewing, wherein the custom content triggering data comprises at least an identifier of the electronic message and a message recipient identifier, wherein the custom content triggering data is indicative of at least a dynamic portion of the customized electronic message content to be inserted into the electronic message during a rendering of the electronic message on the client device; and in response to receiving the custom content triggering data:

determine, by the message processor, attributes of the electronic message being rendered based on the custom content triggering data; and generate the dynamic portion of the customized electronic message content to be inserted into the electronic message based on the attributes of the electronic message, wherein the at least one memory and the computer program code are configured to, with the at least one processor, cause the apparatus to further:

retrieve, based on the message recipient identifier, user profile data associated with a recipient of the electronic message, wherein the user profile data comprises at least a user preference attribute.

9. The apparatus of claim 8, wherein the custom content triggering data is embedded in at least one of an API function call and an HTML image tag within the electronic message being rendered, wherein in an instance in which the custom content triggering data is embedded in the API function call, wherein the computer program code further comprises computer program code configured to, with the at least one processor, cause the apparatus to receive the API function call in response to the opening of the electronic message at the client device, the API function call invoked by the electronic message after the opening of the electronic message while the electronic message is being rendered for viewing, wherein the API function invocation comprises the custom content triggering data as an argument.

10. The apparatus of claim 9, wherein the determined attributes of the electronic message comprise attributes of the recipient and message history attributes that include a time that the electronic message was sent to the recipient and viewed status data representing whether the electronic message previously was viewed by the recipient.

11. The apparatus of claim 10, wherein the computer program code configured to, with the at least one processor, cause the apparatus to generate of the dynamic portion of the customized electronic message content further comprises computer program code configured to, with the at least one processor, cause the apparatus to:

receive attributes data representing the determined attributes of the electronic message;

generate the dynamic portion of the customized electronic message content using the attributes data;

personalize the dynamic portion of the customized electronic message content only for the particular intended recipient based on the user preference attribute, wherein the dynamic portion of the customized electronic message content includes at least one of promotions not yet viewed and/or not yet purchased by the particular intended recipient and promotions related to promotions already purchased by the particular intended recipient; and configure the dynamic portion of the customized electronic message content using at least one message template.

12. The apparatus of claim 11, wherein the computer program code configured to, with the at least one processor, cause the apparatus to personalize the dynamic portion of the customized electronic message content for the particular intended recipient further comprises computer program code configured to, with the at least one processor, cause the apparatus to:

identify, using at least one social network, at least one social connection of the particular intended recipient; and personalize the dynamic portion of the customized electronic message content based on attributes of the at least one social connection.

13. The apparatus of claim 10, wherein the at least one memory and the computer program code are further configured to, with the at least one processor, cause the apparatus to:

caching the generated dynamic portion of the customized electronic message content.

14. The apparatus of claim 13, wherein the computer program code configured to, with the at least one processor, cause the apparatus to generate of the dynamic portion further comprises computer program code configured to, with the at least one processor, cause the apparatus to:

determine, based on the viewed status data, whether the particular intended recipient previously has opened the electronic message; and in response to determining that the recipient previously has opened the electronic message, retrieve the cached dynamic portion of customized electronic message content; and include the cached dynamic portion of customized electronic message content in the generated dynamic portion.

15. A computer program product comprising instructions that when executed by one or more computers cause the one or more computers to perform operations implementing automated generation of customized electronic message content, the operations comprising:

receiving, from a client device, at a message processor, custom content triggering data that has been extracted and transmitted from an electronic message in response to an opening of the electronic message at the client device, after the opening of the electronic message and while the electronic message is being rendered for viewing, wherein the custom content triggering data comprises at least an identifier of the electronic message and a message recipient identifier, wherein the custom content triggering data is indicative of at least a dynamic portion of the customized electronic message content to be inserted into the electronic message during a rendering of the electronic message on the client device; and in response to receiving the custom content triggering data:

determining, by the message processor, attributes of the electronic message being rendered based on the custom content triggering data; and generating the dynamic portion of the customized electronic message content to be inserted into the electronic message based on the attributes of the electronic message, wherein the operations further comprise:

retrieving, based on the message recipient identifier, user profile data associated with a recipient of the electronic message, wherein the user profile data comprises at least a user preference attribute.

16. The computer program product of claim 15, wherein the custom content triggering data is embedded in at least one of an API function call and an HTML image tag within the electronic message being rendered, wherein in an instance in which the custom content triggering data is embedded in the API function call, the computer program product further comprises instructions that when executed by the one or more computers cause the one or more computers to receive the API function call in response to the opening of the electronic message at the client device, the API function call invoked by the electronic message after the opening of the electronic message while the electronic message is being rendered for viewing, wherein the API function invocation comprises the custom content triggering data as an argument.

17. The computer program product of claim 16, wherein the determined attributes of the electronic message comprise attributes of the recipient and message history attributes that include a time that the electronic message was sent to the recipient and viewed status data representing whether the electronic message previously was viewed by the recipient.

18. The computer program product of claim 17, wherein the generating of the dynamic portion of the customized electronic message content comprises:

receiving attributes data representing the determined attributes of the electronic message;

generating the dynamic portion of the customized electronic message content using the attributes data;

personalizing the dynamic portion of the customized electronic message content only for the particular intended recipient based on the user preference attribute, wherein the dynamic portion of the customized electronic message content includes at least one of promotions not yet viewed and/or not yet purchased by the particular intended recipient and promotions related to promotions already purchased by the particular intended recipient; and configuring the dynamic portion of the customized electronic message content using at least one message template.

19. The computer program product of claim 18, wherein personalizing the dynamic portion of the customized electronic message content for the particular intended recipient comprises:

identifying, using at least one social network, at least one social connection of the particular intended recipient; and personalizing the dynamic portion of the customized electronic message content based on attributes of the at least one social connection.

20. The computer program product of claim 17, further comprising caching the generated dynamic portion of the customized electronic message content.

21. The computer program product of claim 20, wherein the generating of the dynamic portion further comprises:

determining, based on the viewed status data, whether the particular intended recipient previously has opened the electronic message; and in response to determining that the recipient previously has opened the electronic message, retrieving the cached dynamic portion of customized electronic message content; and including the cached dynamic portion of customized electronic message content in the generated dynamic portion.

* * * * *